United States Patent [19]

Ahlberg

[11] Patent Number: 4,559,108
[45] Date of Patent: Dec. 17, 1985

[54] DISTILLATION APPARATUS
[75] Inventor: David T. Ahlberg, Sarnia, Canada
[73] Assignee: Polysar Limited, Sarnia, Canada
[21] Appl. No.: 416,001
[22] Filed: Sep. 8, 1982
[30] Foreign Application Priority Data
Oct. 30, 1981 [CA] Canada .................................. 389083
[51] Int. Cl.⁴ .......................................... B01D 3/14
[52] U.S. Cl. .................................... 202/154; 202/186;
202/235; 203/26; 203/71; 203/78; 203/84
[58] Field of Search ....................... 202/154, 186, 235;
203/26, 71, 73, DIG. 9, 78, DIG. 4, 84

[56] References Cited
U.S. PATENT DOCUMENTS

| 2,509,136 | 5/1950 | Cornell | 159/18 |
| 2,555,939 | 6/1951 | Sherwin | 203/78 |
| 2,619,814 | 12/1952 | Kniel | 203/26 |
| 4,018,843 | 4/1977 | Michaux et al. | 203/73 |
| 4,056,444 | 11/1977 | Weicht et al. | 203/26 |
| 4,162,198 | 7/1979 | Stockburger et al. | 203/78 |
| 4,177,111 | 12/1979 | Pieper et al. | 203/73 |
| 4,292,141 | 9/1981 | Lindnepo et al. | 203/84 |
| 4,395,310 | 7/1983 | Idenden | 203/DIG. 4 |

Primary Examiner—Kenneth M. Schor
Assistant Examiner—Virginia Manoharan
Attorney, Agent, or Firm—Stevens, Davis, Miller & Mosher

[57] ABSTRACT

A distillation apparatus is provided for the fractionation of a hydrocarbon stream. A part of the heat energy to operate the apparatus is provided by heat exchange of a recycled bottom liquid stream with an overhead vapor stream which has been compressed with a concurrent increase in temperature. Such an apparatus may be used to fractionate a C₄ hydrocarbon feed.

3 Claims, 2 Drawing Figures

DISTILLATION APPARATUS

This invention is directed to a distillation apparatus for the fractionation of a hydrocarbon stream wherein an overhead vapor stream is compressed with a concurrent increase in temperature and the compressed vapor stream is heat exchanged with a recycled bottom liquid stream of the distillation apparatus.

The purification of hydrocarbons by fractional distillation is a wellknown process used commercially throughout the petrochemical industry. It is also a process known to require a considerable input of energy, which energy has conventionally been steam. Because many such processes utilize a high reflux ratio, that is much of the hydrocarbon is recycled to the distillation tower in order to obtain a pure product, the energy input per unit of purified product is high. As the cost of providing energy, especially steam, increases the incentive increases to develop alternative means of providing at least part of the energy. One such method of providing at least part of the necessary energy is to use a heat pump wherein a stream is compressed with a concurrent increase in temperature and the compressed stream is heat exchanged with another stream in the distillation apparatus. British Pat. No. 1,452,377 describes a fractional distillation process wherein an overhead vapor fraction is compressed with an increase in temperature, the latent heat of condensation of the compressed stream is exchanged with a distillation column stream, the compressor is driven by a turbine using a vapor such as steam as the motive fluid and using the latent heat of condensation of the motive fluid exhaust to heat, by heat exchange, a distillation column stream. U.S. Pat. No. 4,177,111 describes a process for the recovery of dimethylacylamides by preconcentrating a stream containing dimethylacylamide and water in a distillation column, compressing the overhead vapor stream from the distillation column and using the latent heat of condensation of the compressed overhead vapor to heat the distillation column.

According to the present invention there is provided a distillation apparatus comprising in combination a first distillation column, a second distillation column, a compressor, a first heat exchange means connected to said first distillation column, and a second heat exchange means connected to said second distillation column, wherein said first distillation column is equipped with from about 70 to about 100 plates, said second distillation column is equipped with from about 5 to about 20 plates, means is provided for supplying an organic hydrocarbon feed to about a mid-point of said first distillation column, means is provided for supplying a first portion of the bottoms stream from said first distillation column to an upper point of said second distillation column, means is provided for circulating a second portion of the bottoms stream from said first distillation column to said first heat exchange means wherein it is subjected to indirect heat exchange with a stream from said compressor, means is provided for circulating a bottoms stream from said second distillation column to said second heat exchange means wherein it is subjected to indirect heat exchange with a supply of hot water or steam, means is provided for supplying an overhead stream from said second distillation column to a lower point of said first distillation column, means is provided for removing a high boiling component stream from the bottom of said second distillation column, means is provided for removing as purified product a portion of the overhead stream from said first distillation column, means is provided for supplying a second portion of the overhead stream from said first distillation column to said compressor, and means is provided for circulating the compressed stream from said compressor to said first heat exchange means and then to a point in the overhead stream from said first distillation column.

Also according to the present invention there is provided a process of using the distillation apparatus herein described wherein a $C_4$ hydrocarbon feed is distilled to provide isobutylene as purified product and a bottoms stream containing isobutylene and the high boiling impurities comprising di-isobutylene and tertiary butyl alcohol and lesser amounts of impurities such as cis- and trans-butene-2 and butane.

The use is known of a compressor to provide a stream at elevated pressure and temperature which may then be used as a source of energy to supply heat to a distillation column. However, the efficiency of use of such a heat pump system depends on the temperature difference between the overhead vapor stream and the bottom stream of the distillation column. As the temperature difference increases then the energy required to operate the compressor also increases and the installed horsepower of the motor to drive the compressor increases. Effective use can only be made of such a heat pump system when it is applied to a distillation process in which the high boiling impurities have boiling points not too far removed (i.e. usually not more than about 25°–30° C.) from the boiling point of the lower boiling component to be purified or when the high boiling impurities are present in small enough quantities such as not to cause a significant increase in the boiling temperature of the bottoms stream of the distillation column.

In the present invention, use is made of the basic knowledge of how to operate a heat pump system efficiently. It has been discovered that by including in the apparatus a second distillation column which is used to purify the bottoms stream of the first distillation column, efficient use of a heat pump system can be achieved. This unique combination allows the high boiling impurities to be removed as a bottoms stream from the second distillation column which in turn allows the first distillation column to be operated with a relatively small temperature differential between the overhead and bottoms streams which, in turn, allows a heat pump system to be used efficiently with the overhead stream, without excessive horsepower requirements for the compressor of the heat pump system, to provide heat to the bottoms stream for operation of the first distillation column.

Figure 1:
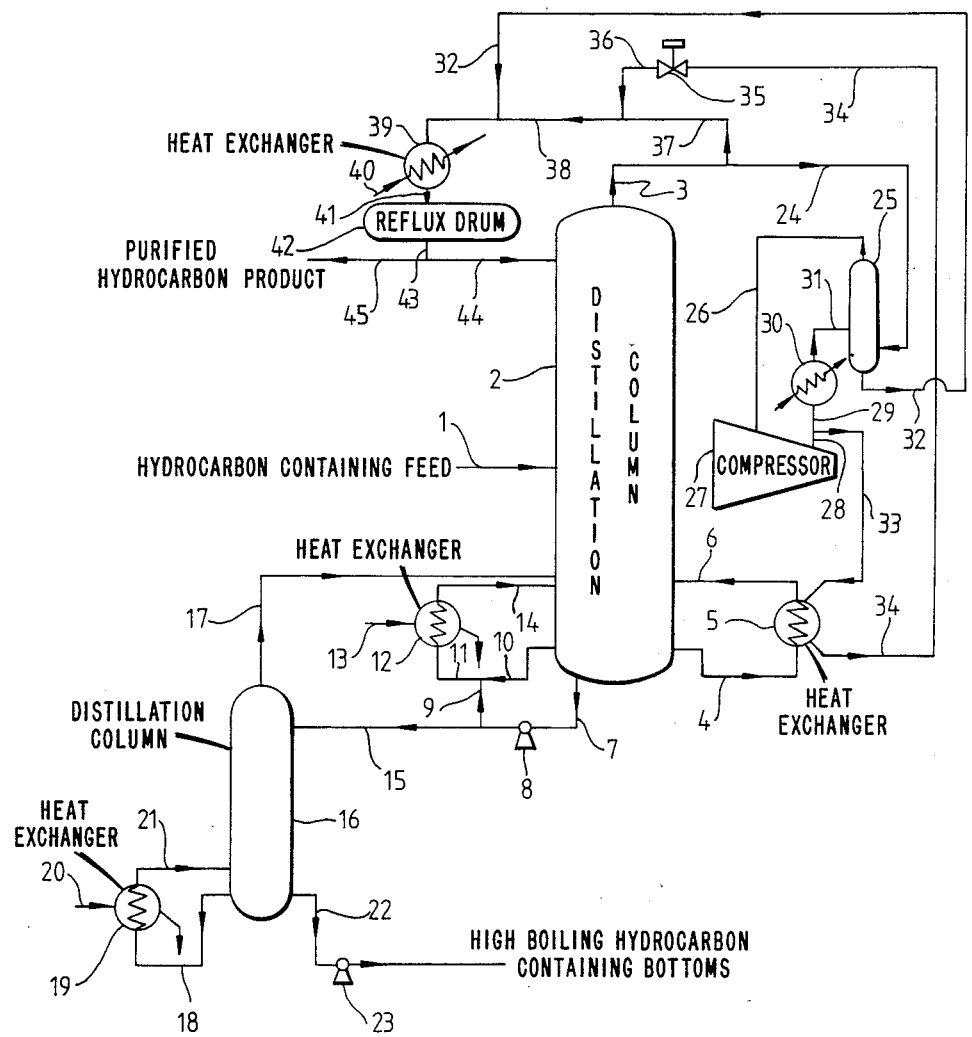
FIG. 1 is a schematic drawing of a distillation apparatus according to the present invention.

Referring now to FIG. 1, line 1 supplies an organic hydrocarbon feed to about a mid-point of the first distillation column 2. The overhead vapor from the distillation column is removed by line 3 which supplies both of lines 24 and 37. Line 37 supplies a portion of the overhead stream to line 38 which in turn supplies it to heat exchanger 39. Heat exchanger 39 is cooled by water supplied through line 40 and the overhead stream is subjected therein to indirect heat exchange and condensed to provide a liquid stream in line 41 which feeds the liquid stream into reflux drum 42. Liquid from the reflux drum is supplied by line 43 to lines 44 and 45, line 44 supplying the liquid back to distillation column 2 for reflux purposes and line 45 supplying the liquid, as purified product, to suitable storage or removal means (not shown). The overhead vapor in line 24 is supplied to drum 25 wherein any liquid can be separated from the vapor and removed by line 32 and supplied to line 38. The vapor passes by line 26 to compressor 27 and leaves the compressor by line 28 as a compressed stream. The compressed stream may be passed during start-up operations by line 29 to the water cooled indirect heat exchanger 30 and the liquified stream then fed back to drum 25. During normal operations, the compressed stream is passed by line 33 through heat exchanger 5 to line 34, pressure reducing valve 35 and line 36 into line 38. Heat exchanger 5 is supplied with a portion of the first distillation column bottoms stream through line 4 and the column bottoms are subjected to indirect heat exchange with the compressed stream in line 33 and then passed back into the column by line 6. A second portion of the first distillation column bottoms stream is removed by line 7 through pump 8 to line 9 or line 15. The bottoms stream in line 15 is supplied to the second distillation column 16 wherein it is subjected to fractional distillation to provide an overhead stream which is supplied by line 17 to a lower point of the first distillation column. Energy to operate the second distillation column is supplied by passing a portion of the bottoms stream by line 18 to heat exchanger 19 wherein it is subjected to indirect heat exchange with hot water or steam supplied by line 20 and the so-heated stream is then passed by line 21 back into the distillation column. A high boiling compound stream is removed from the bottom of the second distillation column by line 22 and may be provided by pump 23 to suitable further handling means (not shown). A further portion of the bottoms stream from distillation column 2 may be taken by line 10 and line 11 into heat exchanger 12 wherein it may be subjected to indirect heat exchange with hot water or steam supplied by line 13 and then returned by line 14 to the distillation column.

Figure 2:
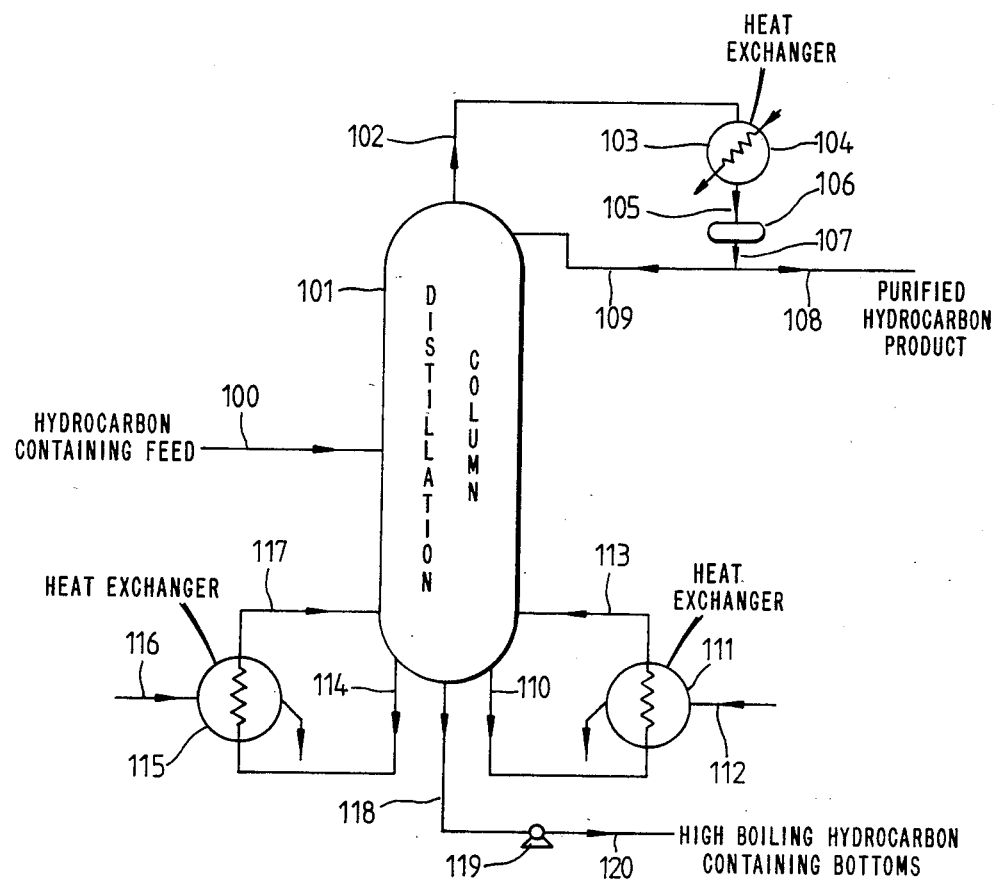
FIG. 2 is a schematic drawing of a conventional distillation apparatus of the prior art.

FIG. 2 illustrates a prior art distillation apparatus. Line 100 supplies the hydrocarbon feed to about a midpoint of distillation column 101. Overhead vapor from the distillation column is removed by line 102 and passed to heat exchanger 103 in which it is subjected to indirect heat exchange with water supplied by line 104. The cooled stream is supplied by line 105 to reflux drum 106 and passes by line 107 to lines 108 and 109. Line 109 returns the stream, for reflux control, to the distillation column and line 108 is for removal of purified material. Heat to operate the distillation column is supplied by one or two heat exchangers, two being shown in the Figure. A bottoms stream from the column is passed by line 110 or line 114 to, respectively, heat exchangers 111 or 115 which are provided with steam by lines 112 and 116. The heated stream is then returned to the column by lines 113 or 117. A bottoms stream is removed by line 118 to pump 119 and line 120 as a means for removing high boiling residues from the column.

To illustrate the use of an apparatus according to this invention, a distillation apparatus as shown in FIG. 1 was used to purify a C$_4$ hydrocarbon stream comprised predominantly of isobutylene. The distillation column 2 was equipped with 100 plates and the distillation column 16 was equipped with 6 plates. A hydrocarbon feed containing about 97 weight percent of isobutylene was supplied at a rate of about 15,900 kg per hour by line 1 to distillation column 2. The feed in line 1 was at a temperature of about 52° C. and a pressure of about 6 kg/cm$^2$, and contained isobutylene and as the major impurities a mixture comprising butenes, tertiary butyl alcohol and di-isobutylene. Purified isobutylene (about 99.7 weight percent isobutylene) was removed through line 45 at a rate of about 15,100 kg per hour. A high boiling component stream, comprising (weight percent) about 44% isobutylene, about 11% butene-2, about 4% tertiary butyl alcohol and about 40% di-isobutylene, was removed by line 22 from the bottom of distillation column 16 at a rate of about 800 kg per hour. Recovery of isobutylene from the feed was about 97.7 percent by weight. The bottoms stream from column 2 was supplied by line 15 to column 16 at a rate of about 8,000 kg per hour and overhead vapor was returned from column 16 by line 17 to column 2 at a rate of about 7,200 kg per hour. About 85% of the overhead vapor stream from column 2 was supplied to compressor 27: the vapor supplied to the compressor was at a temperature of about 50° C. and a pressure of about 5.5 kg/cm$^2$. The compressed vapor in line 33 from the compressor was at a pressure of about 9 kg/cm$^2$ and a temperature of about 73° C. This compressed vapor was supplied to heat exchanger 5 in which it was in indirect heat exchange with a bottoms stream from column 2, thereby supplying heat for the operation of column 2. The compressed vapor fed to the heat exchanger was essentially completely condensed to the liquid phase within the heat exchanger and was removed by line 34 at a temperature of about 66° C. and a pressure of about 8.8 kg/cm$^2$ and passed via pressure reducing valve 35 to heat exchanger 39 and then to reflux drum 42.

The energy input necessary to operate the apparatus comprising the two distillation columns was predominantly provided by the energy obtained from heat exchangers 5 and 19 - heat exchanger 12 was only used for balancing the energy needs and the energy obtained therefrom constituted only about 3–5% of that necessary to operate column 2. For the two columns, the energy necessary to operate column 16 was only about 5 to 10% of that necessary to operate the whole and a portion of that energy was used to operate column 2 by virtue of the supply of hot vapor in line 17. Under normal operating conditions, the energy necessary to operate compressor 27 represented about 40 to about 50% of the total energy necessary to operate the apparatus.

In a distillation apparatus of the prior art, as in FIG. 2, the energy consumption necessary for operation thereof to purify a similar hydrocarbon feed at a similar output rate of purified isobutylene was about 4 to about 5 times the energy necessary to operate an apparatus of the present invention as described hereinbefore.

What is claimed is:
1. A distillation apparatus comprising in combination:
   a first distillation column,
   a second distillation column,
   a compressor,
   a first heat exchange means connected to said first distillation column at the bottom of said first distillation column,
   a second heat exchange means connected to said second distillation column at the bottom of said second distillation column, and means for removing overhead streams and for removing bottoms streams from each of said first and said second distillation columns, wherein
   said first distillation column is equipped with from about 70 to about 100 plates, said second distillation column is equipped with from about 5 to about 20 plates, means is provided for supplying an organic hydrocarbon feed to about a mid-point of said first distillation column, means is provided for supplying a first portion of the bottoms stream from said first distillation column to an upper point of said second distillation column, means is provided for circulating a second portion of the bottoms stream from said first distillation column to said first heat exchange means wherein it is subjected to indirect heat exchange with a stream from said compressor, means is provided for circulating a bottoms stream from said second distillation column to said second heat ecxhange means wherein it is subjected to indirect heat exchange with a supply of hot water or steam, means is provided for supplying an overhead stream from said second distillation column to a lower point of said first distillation column, means is provided for removing a high boiling component stream from the bottom of said second distillation column, means is provided for removing as purified product a portion of the overhead stream from said first distillation column, means is provided for supplying a second portion of the overhead stream from said first distillation column to said compressor wherein said vapor is compressed and heated, means is provided for circulating the heated compressed vapor stream from said compressor to said first heat exchange means wherein it is liquefied and cooled by indirect contact with said second portion of the bottoms stream and then to a point in the overhead stream from said first distillation column.

2. The apparatus of claim 1 wherein said means for removing purified product includes a water cooled indirect heat exchange means, reflux drum and distribution means whereby said portion of the overhead stream from said first distillation column and said compressed stream from said first heat exchange means are cooled in said water cooled indirect heat exchange means and in part removed as purified product and in part returned to said first distillation column.

3. The apparatus of claim 2 wherein a third heat exchange means is connected to said first distillation column whereby a bottoms stream from said column is subjected to indirect heat exchange with a supply of hot water or steam.

* * * * *